United States Patent [19]
Paylor

[11] Patent Number: 5,950,654
[45] Date of Patent: *Sep. 14, 1999

[54] ADAPTOR TOOLS AND METHOD TO EXPOSE VALVE

[75] Inventor: Christopher John Paylor, Mississauga, Canada

[73] Assignee: Liphook Couplers Systems Inc., Ontario, Canada

[ * ] Notice: This patent is subject to a terminal disclaimer.

[21] Appl. No.: 08/855,257

[22] Filed: May 13, 1997

Related U.S. Application Data

[62] Division of application No. 08/173,048, Dec. 27, 1993.

[30]   Foreign Application Priority Data

Jun. 18, 1993   [CA]   Canada ................................. 2098770

[51] Int. Cl.[6] .............................. F16K 43/00; F16K 31/44
[52] U.S. Cl. .......................... 137/15; 81/124.2; 81/125; 81/177.85; 134/21; 134/166 C; 137/364; 137/368; 251/292; 403/328; 450/154
[58] Field of Search .............................. 137/15, 315, 321, 137/363, 364, 368, 369; 81/176.15, 177.85, 124.2, 125; 251/291, 292, 293; 403/328; 405/154; 134/21, 166 C

[56]   References Cited

U.S. PATENT DOCUMENTS

| | | |
|---|---|---|
| 43,056 | 6/1864 | Weldon .................................... 137/368 |
| 400,944 | 4/1889 | Powell ..................................... 251/293 |
| 4,643,218 | 2/1987 | Reed, Jr. .................................. 137/364 |
| 4,649,948 | 3/1987 | Hudson .................................... 137/318 |
| 4,702,275 | 10/1987 | Ballun et al. ............................ 137/369 |
| 4,832,069 | 5/1989 | Gale ........................................ 137/318 |
| 4,860,992 | 8/1989 | Aunspach ................................ 251/292 |
| 5,070,895 | 12/1991 | Kelly ....................................... 137/368 |

FOREIGN PATENT DOCUMENTS

| | | | |
|---|---|---|---|
| 2380381 | 10/1978 | Germany ................................ 137/364 |
| 101409 | 2/1963 | Norway .................................. 137/364 |

OTHER PUBLICATIONS

Griffin, Jeff, "Vacuum Excavation Growing in Popularity" Pipeline & Utilities Construction, pp. 1–5, Feb. 1996.

*Primary Examiner*—George L. Walton
*Attorney, Agent, or Firm*—Eugene J.A. Gierczak

[57]   ABSTRACT

This invention relates to an adaptor having one end for activating a valve and another end for connection to a rod said adaptor including a socket at said one end to register with said valve for operating said valve, and including a slot at said other end for receiving and pivotally connecting to said rod. The invention also teaches a pin removal tool for removing pins underground from the surface.

16 Claims, 10 Drawing Sheets

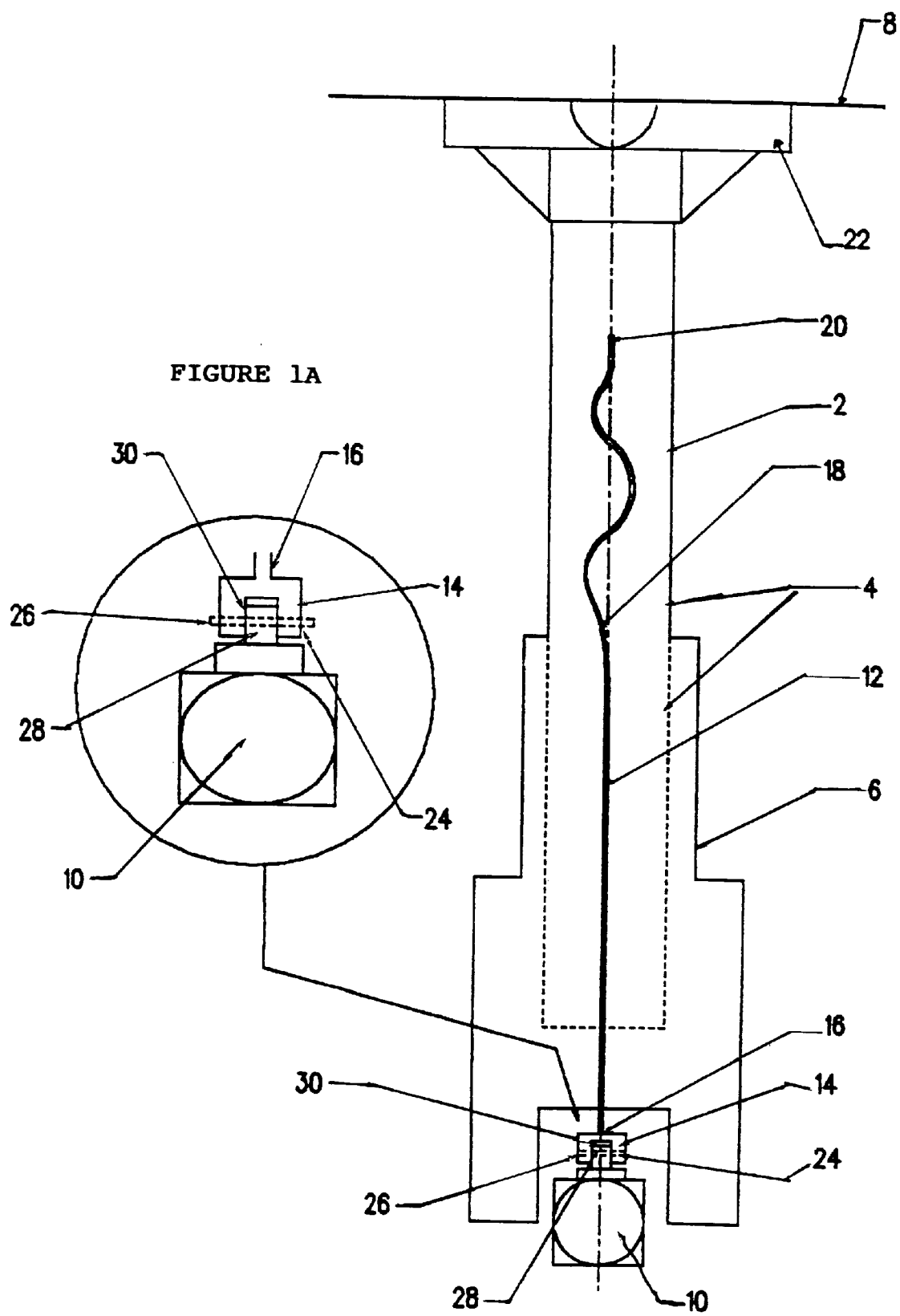

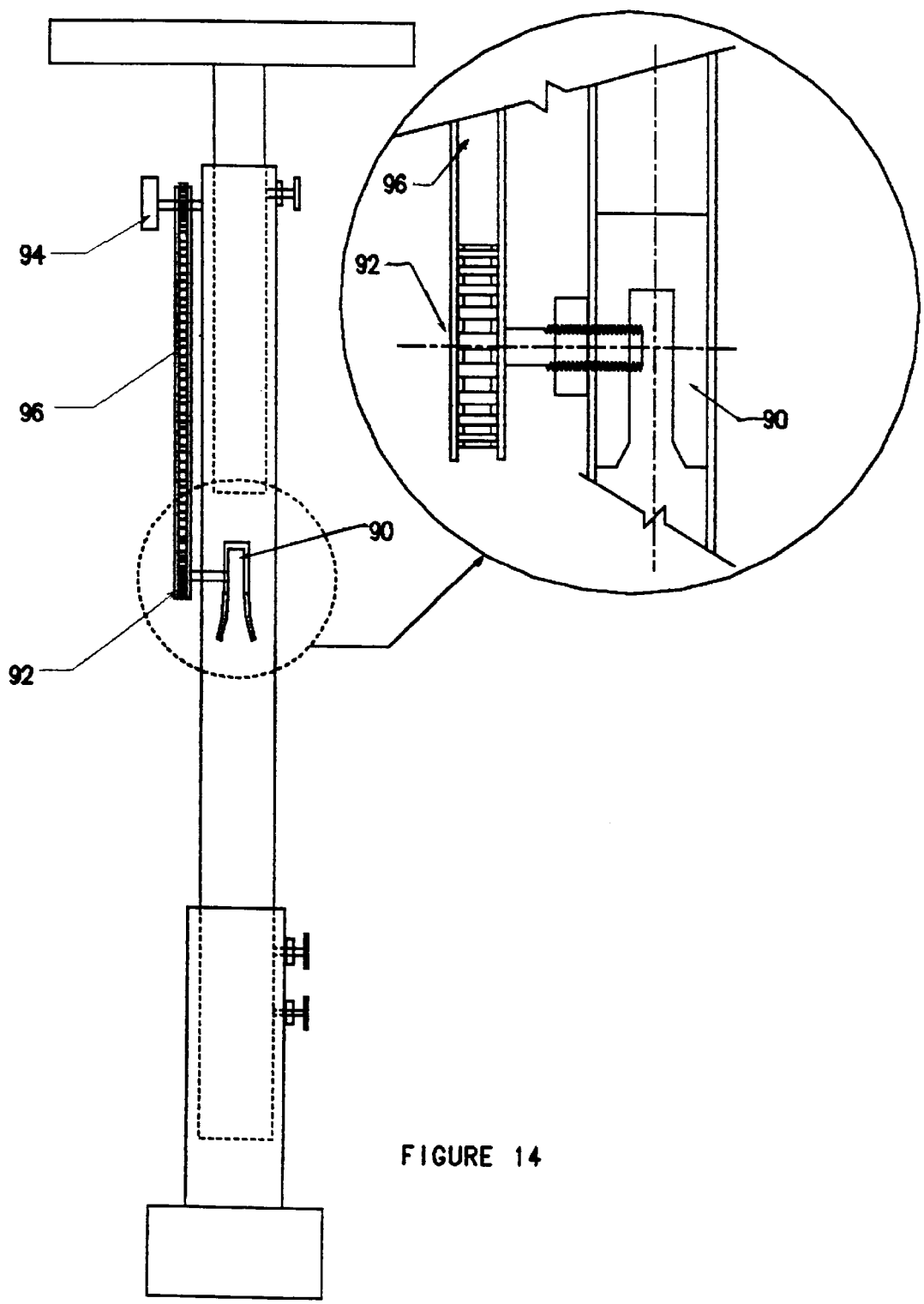

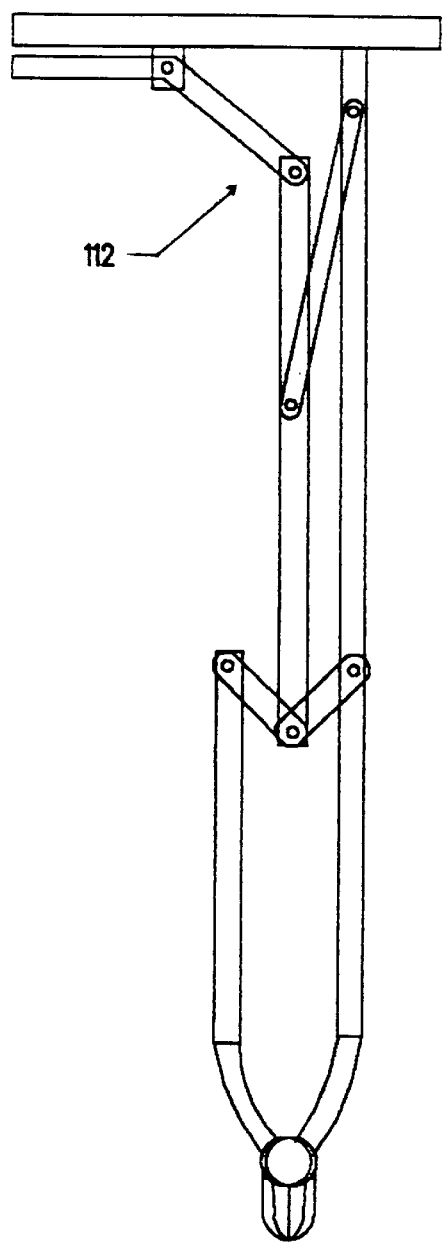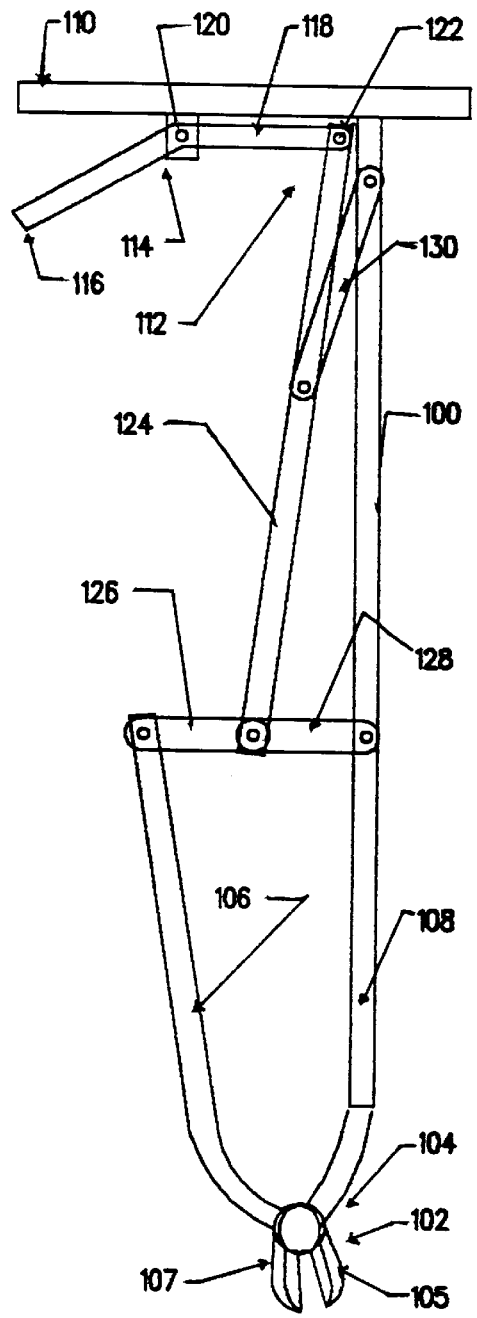
CLOSED POSITION
FIGURE 16
OPEN POSITON
FIGURE 15

ADAPTOR TOOLS AND METHOD TO EXPOSE VALVE

FIELD OF INVENTION

This application is a division of application Ser. No. 08/173,048 filed on Dec. 27, 1993 for an invention entitled ADAPTOR TOOLS AND METHOD TO EXPOSE VALVE.

This invention relates to an adaptor for activating a valve, which activator includes a socket having at least one displaceable engageable ball plunger for gripping the valve and particularly relates to a service box assembly for a valve disposed in the ground which utilizes said adaptor. A method of exposing a valve to reinstall an inoperable service box rod in a service box assembly having a valve below ground level is also taught including an installation tool to locate and maintain a service box rod within a service box assembly.

BACKGROUND OF THE INVENTION

Service boxes complete with rods are widely used in the public utility field to provide access or operation to the valve and other control components of conduits and pipelines buried in the ground. For example, U.S. Pat. No. 3,548,864 teaches a curb box and a method for making the same, which is formed of mouldable synthetic material, others are made of iron/steel.

Another arrangement is shown in U.S. Pat. No. 3,746,034 which relates to a curb box which is installed in the ground in valve protecting position and is positioned vertically so that if an upper portion of the box is sheared off or otherwise accidentally removed, the remaining box portion will be detectable because of the presence of a portion of the detectable metallic means.

Yet another arrangement is shown in U.S. Pat. No. 4,643,218 which relates to a cleaner and actuator device for remote access valve controls.

Finally, U.S. Pat. Nos. 43,056 and 380,308 teach a stop cock and case for pipes leading from street mains and a stop cock box respectively.

A common problem which utilities encounter relates to the operation of the control valve, stop cock, curb stop, when the service box rod and/or key becomes disconnected from the valve or shut-off. Traditionally, the method of connecting the service box rod and/or key to the curb stop or valve curb stop or control valve has been by means of a fork or prong that is welded or moulded to the rod and a cotter pin or other similar pin produced from non-corrosive material, such as brass, is used to secure the rod or key to the valve. Very often, the non-corrosive cotter pin or pins is not used or is replaced with a cotter pin or pins that is corrosive. Therefore, the cotter pin or pins corrodes the rod or key, becomes disconnected from the valve, which results in the valve becoming inoperable. Moreover, the cotter pin may also become disconnected or broken through time. Moreover, sometimes the pins are not used to attach the rod and once operated the rod becomes detached from the valve. Furthermore, non stainless steel rods are used which corrode and must be repaired or replaced.

It is an object of this invention to provide an improved adaptor which can be utilized to quickly and efficiently repair an inoperable connection between the rod or key and valve. It is another object of this invention to provide an alternative to the pin connecting method by utilizing a displaceable engageable member.

It is another object of this invention to provide an improved method for removal of the valve box and rod in order to reconnect the service box rod or key to the valve by utilizing a high pressure water washout and vacuum method.

It is an aspect of this invention to provide an adaptor for activating a valve, said adaptor including a socket at one end thereof to register with the valve, the socket including at least one displaceable engageable member for gripping the valve when the socket is urged against the valve for operating the valve.

It is another aspect of this invention to provide a service box assembly for a valve disposed in the ground said service box assembly including: upper and lower tubular telescopic portions for presenting an access passage from the valve to ground level; a removable cover plate to cover said access passage; an adaptor for activating said valve, said adaptor including a socket at one end thereof to register with the valve, said socket including at least one displaceable engageable member for gripping said valve when said socket is urged against said valve for operating said valve; a service box rod disposed within said access passage and connected to said adaptor for rotating said adaptor and said valve to open said valve in a first position and to close said valve in a second position.

It is yet another aspect of this invention to provide a method of connecting a service box rod to a valve having an operable lug with a depression therein in the ground comprising the steps of: connecting one end of the rod to one end of the adaptor, where the adaptor has a socket at the other end opposite said end connected to the rod, said socket including at least one displaceable engageable member; urging the adaptor over the operable lug of said valve and displacing said engageable members so as to register and lock with said depression of said lug and grip said lug for operating the valve.

It is also another aspect of this invention to provide a method of exposing a valve to reinstall an inoperable service box rod in a service box assembly having a valve below ground comprising the steps of: creating a hole in the ground just sufficient to clear the service box assembly by using a high-pressure water or air washout and vacuuming the debris until the ground has been excavated around the service box assembly to said valve; removing said service box assembly; removing said service box rods having a fork with apertures at one end thereof; connecting an adaptor having an extension with a hole at one end thereof for alignment with said apertures of said fork and forcing a locking pin through said hole and said apertures, said adaptor including a socket at another end thereof, said socket including at least one displaceable engageable member; reintroducing said service box assembly over said valve; urging said adaptor over said valve and displacing said engageable member with said valve for operating said valve; filling said hole.

It is yet another aspect of this invention to provide an installation tool to locate and maintain a service box rod within the service box assembly comprising; a clamping mechanism for clamping the end of the service box rod; a first pulley connected to the clamping mechanism for releasably clamping the end of the service box rod when the first pulley is activated; and a second pulley connected to the first pulley for activating the first pulley.

It is yet another aspect of this invention to provide an adaptor having one end for activating a valve and another end for connection to a rod said adaptor including a socket at said one end to register with said valve for operating said valve, and including a slot at said other end for receiving and pivotally connecting to said rod.

It is a further aspect of this invention to provide a pin removal tool for removing a pin comprising first and second arms connected to gripping means for removing said pin when said arms are moved from an open position to a closed position, fixed handle means fixedly secured to one of said arms, and displaceable handle means, connected to said other arm, adapted to move said other arm relative said one of said arms so as to remove said pin.

Yet a further aspect of this invention provides for a method of exposing a valve to repair an inoperable service box rod in a service box assembly having a valve below ground by creating a hole in said ground sufficient to clean said service box assembly by using a high-pressure fluid to loosen and clear said ground from around said service box assembly for access to said inoperable service box rod for repair of the service box rod from the surface.

DESCRIPTION OF THE DRAWINGS

These and other objects and features of the invention shall now be described in relation to the following drawings:

FIG. 1 is a front elevational view of the prior art service box assembly.

FIG. 14 illustrates an installation tool for installing the rod/key complete with adaptor attached.

FIG. 15 illustrates a tool in an open position to cut and/or remove a cotter pin, clip or wire from the stop cock, control valve, curb stop or valve.

FIG. 16 illustrates a tool in a closed position to cut and/or remove a cotter pin, clip or wire from the stop cork.

DESCRIPTION OF THE INVENTION

Figure 17A:
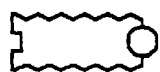
FIG. 17A is a side view of a fixed ball.
Figure 17B:
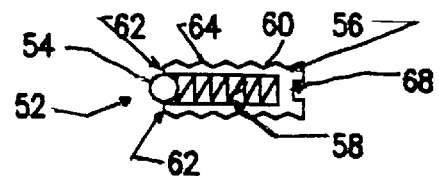
FIG. 17B is a cross-sectional view of a displaceable ball.

Like parts have been given like numbers throughout the figures.

FIG. 1 is a drawing of the prior art which shows the utilization of a service box assembly 2 which includes an upper telescoping portion 4 and lower telescoping or dog house 6 which are adapted to slide relative to one another so as to adjust the height of the service box assembly 2 between ground level 8 and the depth of the valve 10. The valve can be anywhere between 8 and 9 feet below ground level or any other depth which is suitable to the particular pipe or conduit. For example, depth of conductor pipe could be between 3 to 12 feet deep.

The common service box assembly 2 also includes a service box rod/key 12 which has a fork/connector 14 at one end 16 thereof and a bent or zig-zag portion 18 at the other end 20 thereof. The zig-zag portion 18 is adapted to generally centre the service box rod/key 12 within the telescoping portion 4.

The service box assembly 2 presents an access passageway between ground level 8 and the valve 10. The top of the service box assembly 2 includes a cover plate 22 which is attached to the service box assembly 2 in a manner well-known to those persons skilled in the art.

A service box rod 12 is generally comprised of stainless steel or other material and is adapted to turn the valve 10 in a manner well-known to those persons skilled in the art. In particular the service box rod 12 includes a fork or prong 14 which is connected to one end 16 of the rod by means of welding or the like. The fork 14 includes two aligned apertures 24 which are adapted to receive a cotter pin or other locking pin 26. In particular, the valve 10 includes an extension or lug 28 having a hole, depression or indent 30 therethrough for aligning with the apertures 24 of the fork 14 so as to receive the cotter pin 26.

Typically the subject supplier incorporates the practice to use a non-corrosive material such as brass/stainless steel to manufacture the cotter pin or other similar pin 26 to connect the rod 12 to the valve 10. During installation of the rod 12, it is not unusual that the currently used brass cotter pin or other similar pin 26 or other non-corrosive material pin is lost or replaced with a pin of material that corrodes such as the common nail/wire. Accordingly, when it becomes necessary to operate the valve 10, the rod 12 becomes inoperable as the pin 26 has corroded or the rod 12 is "off" the valve 10. Non stainless steel rods rust apart and also need to be replaced. Accordingly the valve 10 now needs to be excavated to allow it to be exposed and to have the rod 12 replaced or reconnected to the valve 10. The valve 10 can be located in the lawn area or a paved driveway and in either situation expensive and extensive digging procedures have heretofore been implemented to fix the inoperable valve 10. Normally a hole large enough to allow a person to make the repair is required in the prior art. Such method is both time consuming and expensive as the excavation is done by hand or by a back hoe which requires appropriate reinforcement to prevent the ground from caving in while it is being repaired.

Furthermore, the property owner typically experiences unwanted property damage which requires clean-up and repair as well as the possibility of extensive re-asphalting of a portion of the driveway in order to clean-up the repair/or landscaping, sod, trees, flowers, etc.

Accordingly, the FIGS. 2–6 illustrate one embodiment of the invention which illustrates an adaptor or coupler 40 which has a socket 42 at one end thereof adapted to register with the lug 28 of a valve 10. Moreover the adaptor includes at the other end thereof, an extension 44 having a hole 46 therethrough.

In particular the adaptor 40 presents a generally cylindrical body member 48 which extends along the axial length thereof so as to define an axis of rotation 50. The hole 46 and extension 44 is disposed radially relative said cylindrical portion 48.

Figure 2:
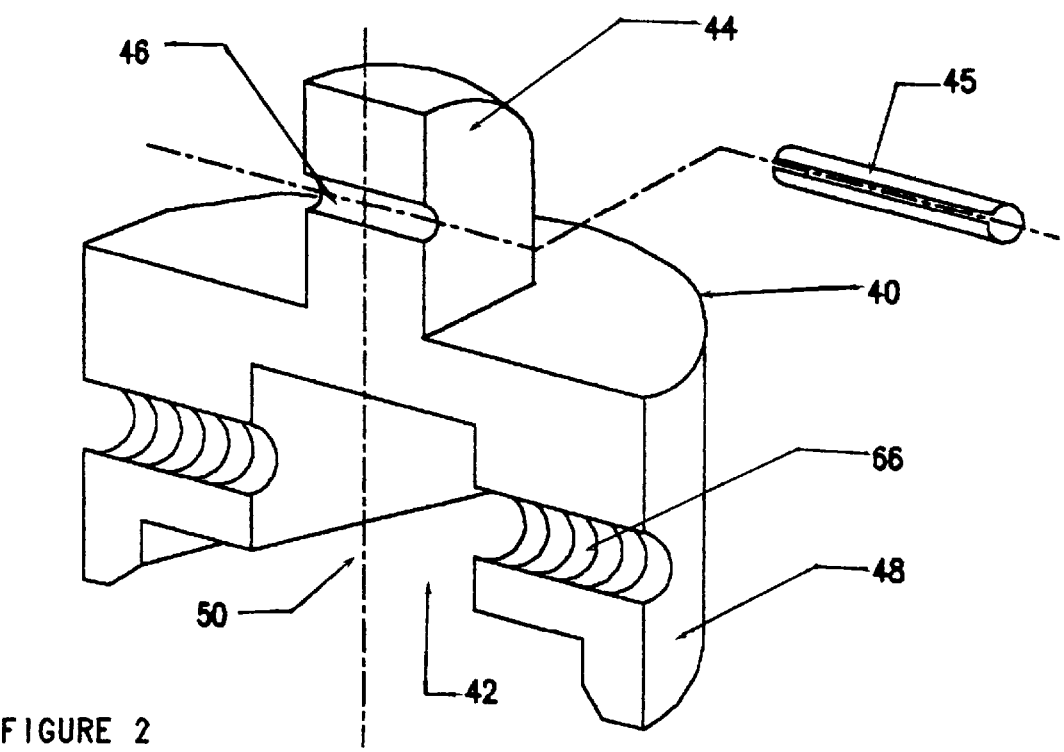
FIG. 2 is a cross section perspective view of the adaptor.

The socket 42 includes at least one displaceable engageable member 52 and in an embodiment shown in FIG. 2 comprises two displaceable engageable members 52. The displaceable engageable members are adapted to grip the valve 10 and particularly the lug 28 when the socket 42 is urged against the valve 10 in a manner to be more fully described herein.

In the embodiment shown in FIGS. 2–6 inclusive, the two displaceable engageable members 52 are displaced opposite one another radially of the axis of rotation 50.

Figure 6:
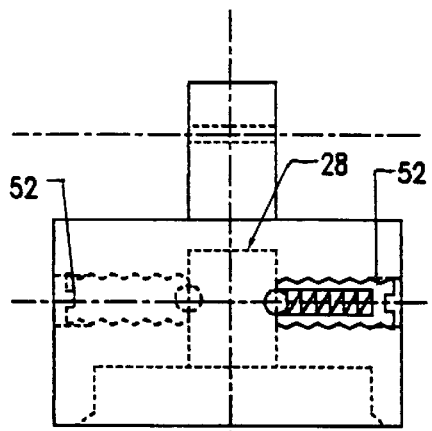
FIG. 6 is a cross-sectional view of the adaptor.
Figure 4:
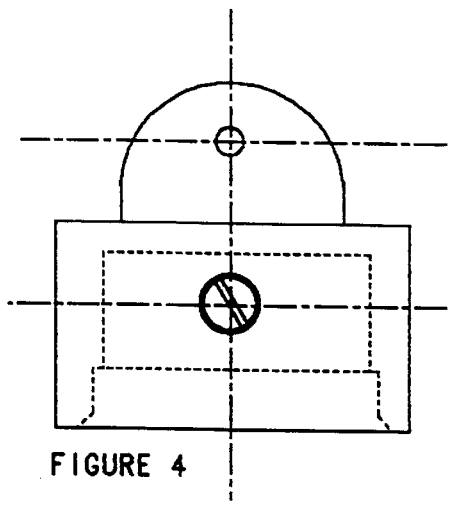
FIG. 4 is a side elevational view of the adaptor.
Figure 5:
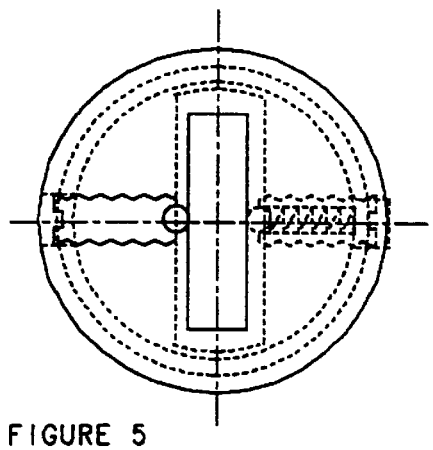
FIG. 5 is a top view of the adaptor.
Figure 3:
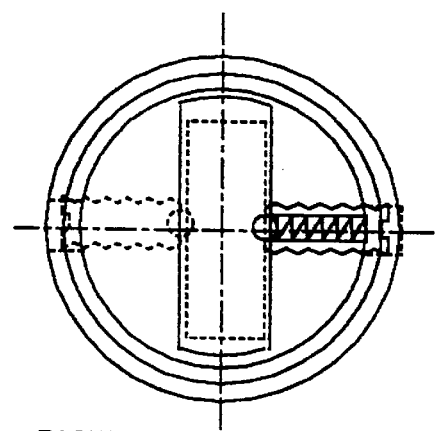
FIG. 3 is a bottom view of the adaptor.

In particular the displaceable engageable members 52 comprise a spherical member or ball 54 and a housing 56 which has a hole or bore 58 therethrough for housing a spring mechanism 60. The spring 60 is inserted into the bore 58 and the ball member 54 pushed into the bore 58 and the open end 62 is ball-pinned over in a manner well-known to those persons skilled in the art so as to capture the ball member 54. Accordingly, the displaceable engageable member 52 comprises a ball plunger whereby the ball 54 is adapted to be displaced or moveable within the bore 58. The spring 60 urges the ball 54 in a biased position as shown in FIG. 6. The housing 56 includes a threaded exterior 64 for threading the displaceable engageable member 52 in suitable threadable hole 66 by engagement with the slot 68 by means of a screwdriver or the like. Therefore the displaceable engageable members 52 may be threaded into the housing 48 as best seen in FIG. 6.

Although the figures illustrate the use of two displaceable engageable members 52, it should be noted that only one displaceable engageable member 52 is necessary for the operation of the invention as described herein. In other words one displaceable engageable member 52 or ball plunger 52 may be utilized. Alternatively, the second ball 54 may be fixed as shown in FIG. 16.

Accordingly, when it is discovered that a rod 12 is inoperable to operate the valve 10 the rod 12 is required to be removed from the service box assembly 2. Thereafter the extension 44 is designed to fit between the forks 14 of the rod 12 and the apertures 24 of the fork 14 is aligned with the hole 46 of extension 44. Thereafter a suitable non-corrosive cotter pin or other locking pin 45 may be driven through the apertures 24 and hole 46 of the adaptor 48.

Accordingly an adaptor 48 is connected at the other end to the service box rod 12 so as to retrofit an inoperable service box rod. Thereafter any dirt or debris around the valve is removed and the retrofitted service box rod with adaptor 48 placed down over the valve 10 in the manner whereby the socket 42 is urged against the lug 28 whereby the ball(s) 54 of the displaceable engageable members 52 are pushed and forced over the lug so as to register with the hole, depression or indent 30 of the lug 28. In particular, the socket 42 is dimensioned so as to receive the lug 28. Moreover, as the socket 42 is urged over the lug 28, the ball(s) 54 of displaceable engageable members 52 contact the outside edges of lug 28 and upon further urging the ball(s) 54 push against the springs 60 so as to cause the ball(s) 54 to move within the bores 58 and thereby ride over the lug 28 until the ball(s) 54 register with the hole 30. Once the ball(s) 54 register with the hole, depression or indent 30, the ball(s) 54 are pushed by the springs 60 so as to register with the hole 30 and grip the lug 28 as best seen in FIG. 6.

Accordingly, if for some reason the rod 12 must be removed, it may be simply pulled away from the valve 10 for disengagement whereby, again, the ball(s) 54 would move within their respective bores 58 so as to clear the lug 28 and then spring back once the socket cleared the lug 28. By urging the socket against the valve 10 the adaptor is firmly secured to the valve 10 by means of the displaceable engageable members 52 so as to repair the inoperable valve. Moreover it has been found that good positive securement of the adaptor 40 is capable even if the valve 10 is not at a horizontal angle and instead is disposed at an incline from the vertical or horizontal plane.

Figure 7:
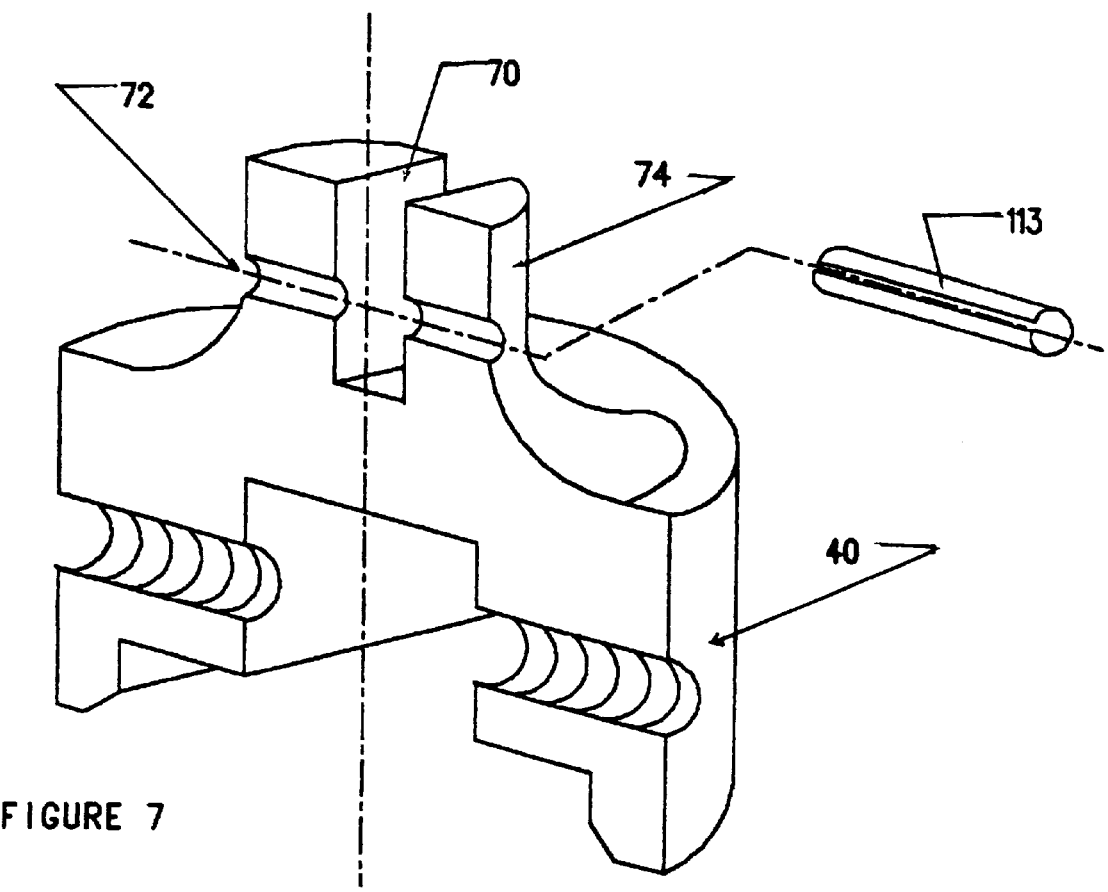
FIG. 7 is a full cross-sectional perspective view of a second embodiment of the adaptor.
Figure 11:
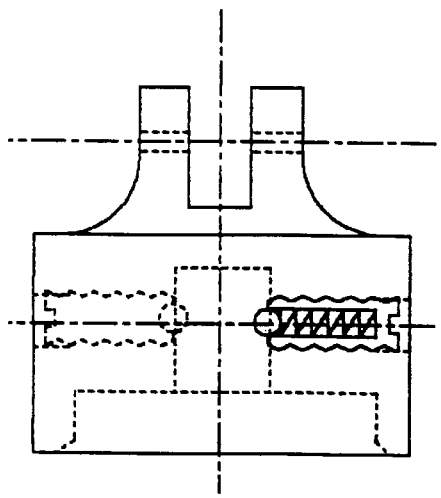
FIG. 11 is a cross-sectional view of the adaptor shown in FIG. 7.
Figure 9:
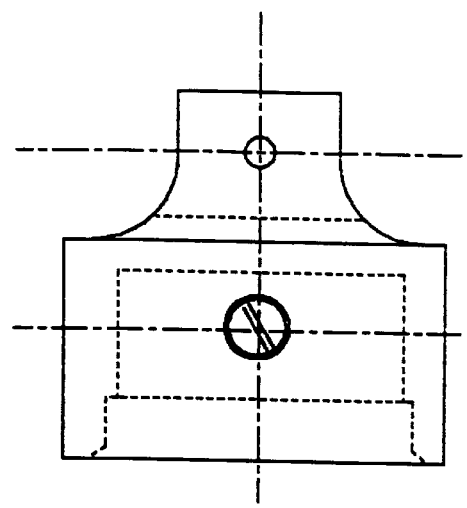
FIG. 9 is a side elevational view of the adaptor shown in FIG. 7.
Figure 10:
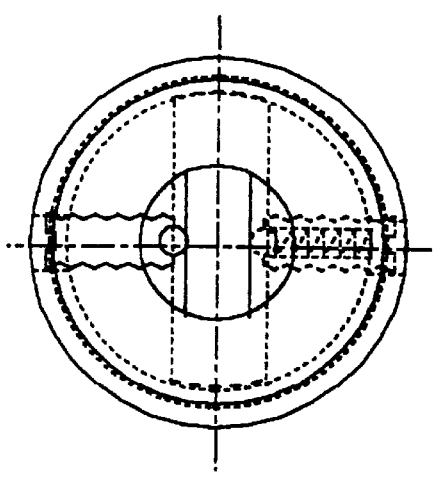
FIG. 10 is a top view of the adaptor shown in FIG. 7.
Figure 8:
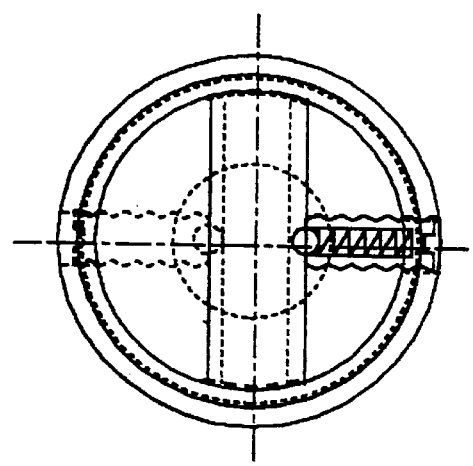
FIG. 8 is a bottom view of the adaptor shown in FIG. 7.
Figure 18:
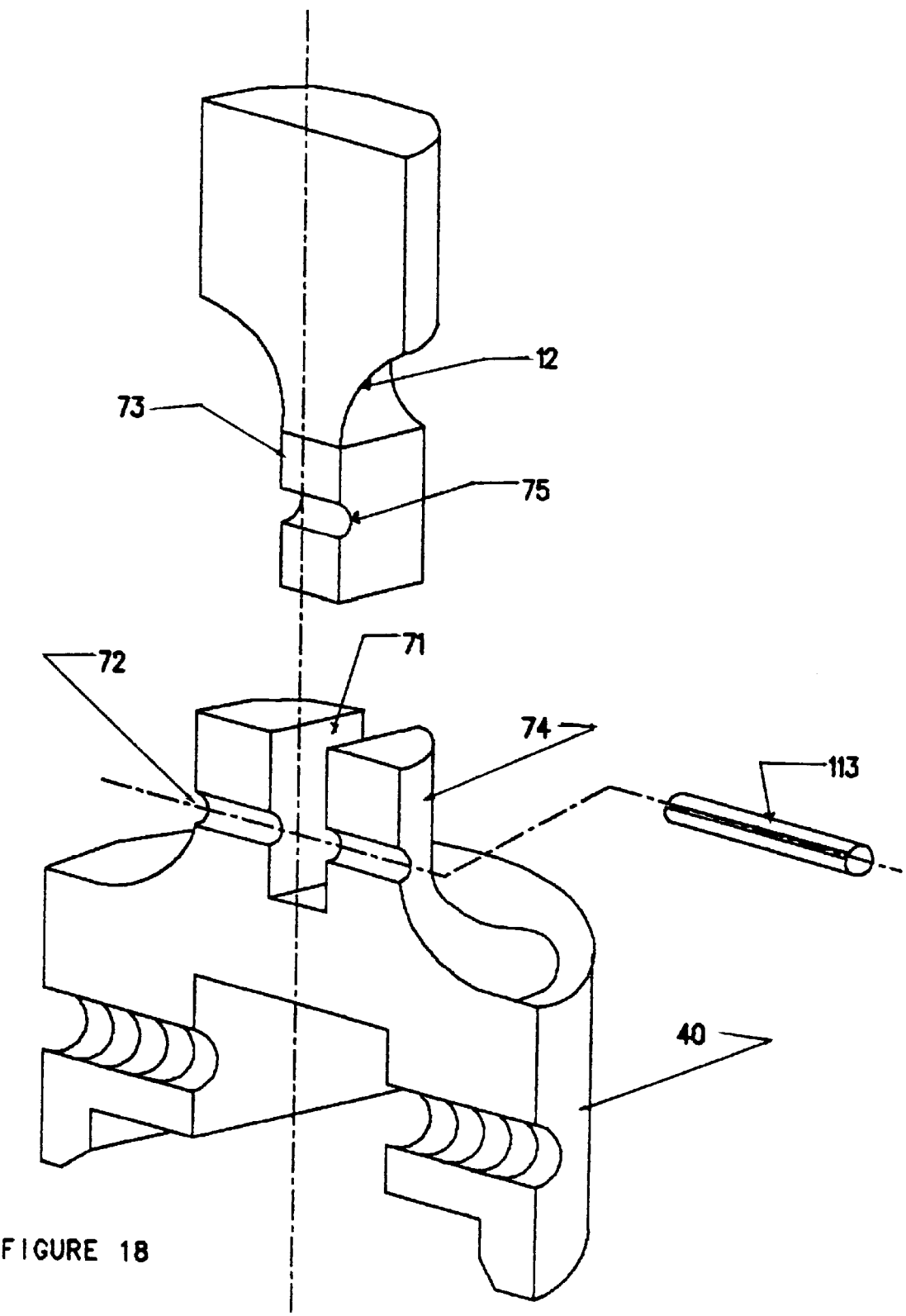
FIG. 18 is a full cross-sectional perspective view of a third embodiment of the adaptor.
Figure 22:
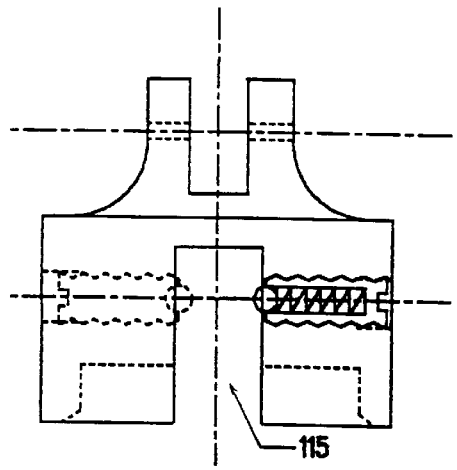
FIG. 22 is a cross-sectional view of the adaptor of FIG. 18 showing the slot.
Figure 20:
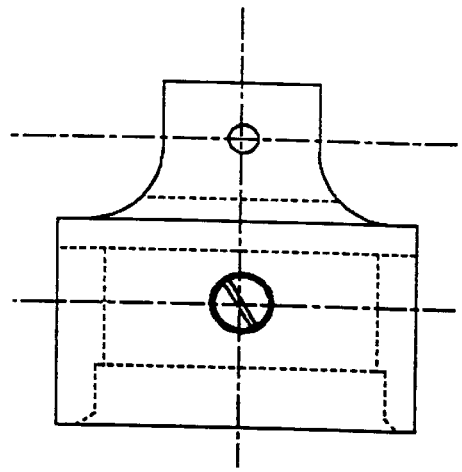
FIG. 20 is a side elevational view of the adaptor shown in FIG. 18.
Figure 21:
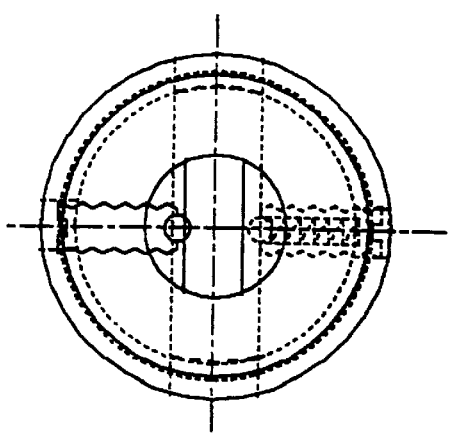
FIG. 21 is a top view of the adaptor shown in FIG. 18.
Figure 19:
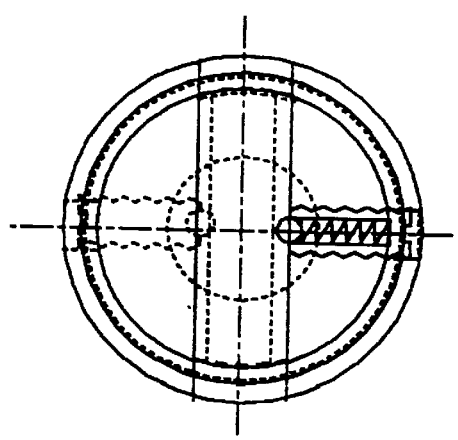
FIG. 19 is a bottom view of FIG. 18.

An alternate embodiment is shown in FIGS. 7–11 inclusive, which include parts which are essentially the same as shown in FIGS. 2–6 except that the adaptor 40 is connected to the rod 12 by means of utilizing a connection with the hole 70 so as to fit within the hole 70 and be secured by the pin. Other methods of connection could include welding, threaded engagement, or other suitable means, for an engagement with a service box rod/key 12 which does not include the fork 14 but rather includes an end which is engageable with the hole 70. In the arrangement shown in FIG. 7 the hole 70 is orientated and disposed along the axis. A locking pin 113 as shown in FIG. 18 is utilized in extension 74 as shown in FIG. 7. In one arrangement the diameter of one end of the rod is dimensioned so as to fit within the hole 70 and be secured by the pin.

The adaptor 40 shown in FIG. 7 may be utilized as a new part to be included in a service box assembly whereby the rod 12 is connected to the adaptor 40 so as to be placed in new installation or alternatively, the embodiment shown in FIG. 7 may be utilized to retrofit or repair inoperable valves. However, it should be noted that the adaptor 40 shown in FIGS. 2–6 has been designed so as to enable a person to retrofit a service box rod while the adaptor shown in FIG. 7 may be utilized during the manufacture of new rods connected to the adaptor 40.

Figure 12:
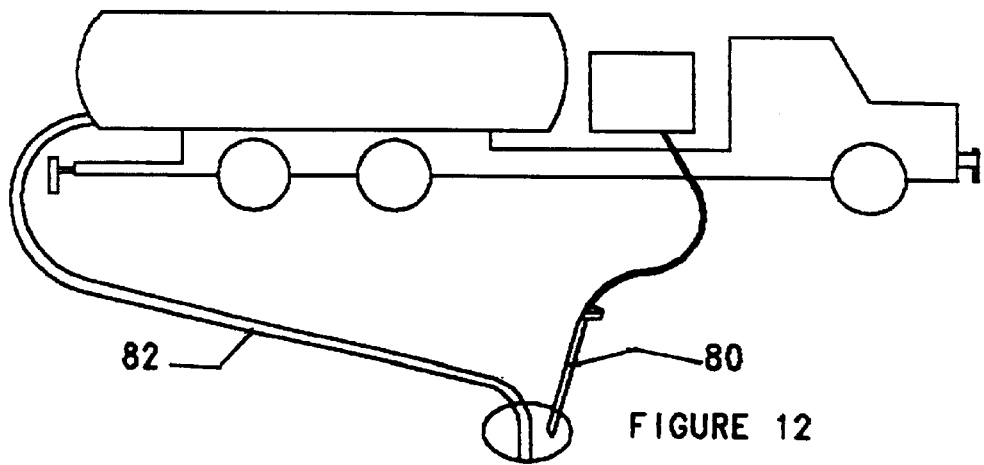
FIG. 12 illustrates a truck having a high-pressure water or air line and vacuum hose.
Figure 13:
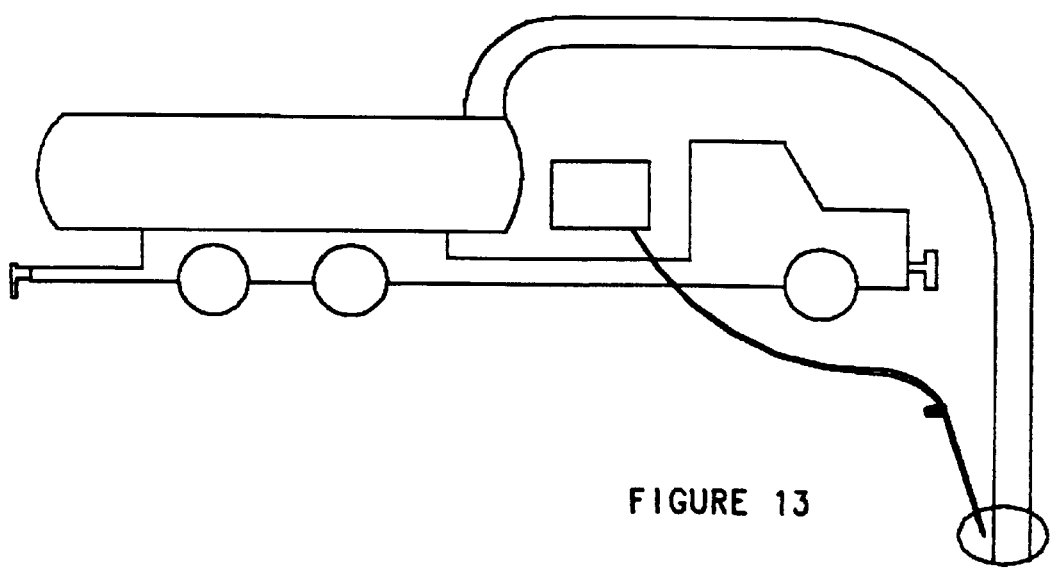
FIG. 13 shows an alternative truck having a high-pressure water or air line and more powerful vacuum mechanism.

FIG. 12 illustrates a method of exposing a valve to reinstall an inoperable service box rod in a service box assembly having a valve below ground level.

Under the old method it was necessary to excavate around the service box which required digging of a huge hole. In the embodiment shown in FIG. 12, it is only necessary to dig a round hole sufficiently large enough to clear the service box. Typically, a hole of approximately 12 inches in diameter would be sufficient. Accordingly, in the embodiment shown in FIG. 12 a pick (not shown) may be utilized to cut through the top layer of asphalt in a driveway or the like and thereafter a high pressure fluid wash-out tool 80 (such as a water wash-out tool or air wash out tool) may be utilized which has sufficient force to "cut" or push gravel, dirt or the like from around the service box assembly 2. Thereafter a vacuum hose 82 may be utilized to vacuum up the loose debris which has been loosened by the high pressure water or air wash-out 80. This operation is continued until the dirt around the service box assembly 2 has been removed down to the valve 10. Thereafter the service box assembly 2 can be removed so as expose the valve 10. The rod 12 is also removed in the manner well-known to those persons skilled in the art. If the cotter pin 26 has been corroded or not used, the rod 12 may be easily removed. If however a portion of the cotter pin 26 is still intact or if the rod 12 is still partially or fully connected to the valve 10, a suitable tool (as shown in FIG. 15) to remove the pin 26 may be utilized so as to disengage or dislodge the rod 12 from the valve 10. Thereafter the rod 12 as shown in FIG. 1 having the fork 14 may be utilized to connect to the adaptor shown in FIG. 2 as described above. The rod 12 may then be reattached to the valve 10 such that the adaptor 40 registered as over the valve 10 and rod/key and in particular the socket 42 is urged against the lug 28 in a manner described above whereby the displaceable engageable means 52 register with the valve 10 as described above. The service box assembly 2 may then be lowered over the rod 12 and over the valve 10 in a manner well known to those persons skilled in the art.

Alternatively, the installation tool as shown in FIG. 14 may be utilized should the valve 10 be too deep to connect the rod/key 12 to the valve 10.

The installation tool as shown in FIG. 14 includes a clamping mechanism 90 which is connected to a first pulley assembly 92 adapted to activate the clamping mechanism 90 so as to clamp the end 20 of the rod 12 to fixedly secure same. A second pulley assembly 94 may be utilized which is connected to the first pulley assembly 92 by means of a pulley chain or the like 96. In particular the second pulley assembly 94 is activated so as to turn first pulley assembly 92 by means of the chain 96 so as to clamp the end 20 of the rod 12. The insertion tool is then inserted into the access passage defined by the service box assembly 2 so that the adaptor 40 can engage in the valve 10 as described above. Once the engagement has taken place, the second pulley assembly 94 is deactivated so as to cause the first pulley assembly 92 to move and unclamp the clamping mechanism 90 from the end of the rod 12. Thereafter the insertion tool may be removed from the ground and the curb box/valve box 4 placed over the rod/key 12. Thereafter the hole around the service box assembly 2 may be filled in. If the small twelve inch diameter hole is located in the driveway only a small portion of asphalt will be necessary to repair the excavation, likewise if in a lawn area, only a small portion of sod will be necessary to repair the excavation.

Moreover, FIG. 15 illustrates a pin removal tool 100 in an open portion, while FIG. 16 illustrates the pin removal tool 100 in a closed position. The pin removal tool 100 may be used to cut or dislodge a cotter pin 26 as described above.

In particular, the pin removal tool includes a gripping portion 102 which moves from an open position shown in FIG. 15 to receive the pin 26 to a closed position shown in FIG. 16 so as to grip or cut the cotter pin 26. The cutter portions 102 move about pivot point 104.

The pin removal tool 100 includes a first arm 106 and a second arm 108. The first arm 106 is shorter than second arm 108. Moreover first arm 106 is connected to, or an extension of, gripping jaw 105 while second arm 108 is connected to, or an extension of gripping jaw 107. The second arm 108 is fixedly secured to a fixed handle portion 110 which is disposed at an angle to second arm 108. In the embodiment shown in FIG. 15, fixed handle portion 110 is disposed at 90 degrees to second arm 108.

Moreover, the pin removal tool 100 also includes a displaceable handle means 112 which are adapted to displace or move first arm 106 relative the second arm so as to cause the jaws 105 and 107 to move from an open position to a closed position so as to grip or cut said pin 26.

In particular, the displaceable handle means 112 comprises a displaceable handle 114 which includes a first displaceable handle portion 116 and a second displaceable handle portion 118 disposed at an angle to the first displaceable handle portion 116. The displaceable handle portion 114 is adapted to pivot about pivot point 120 which is connected to the fixed handle portion 110.

One end of the second displaceable handle portion 118 is connected by means of a pin 122 to a connecting member 124. The connecting member 124 is adapted to move downwardly when the displaceable handle means is moved from an open position shown in FIG. 15 to the closed position shown in FIG. 16.

The connecting member 124 is connected at one end to the displaceable handle 114 and at the other end to the displaceable handle 114 and at the other end to linkages 126 and 128. One end of the linkages 126 and 128 are connected to first and second arm 106 and 108 respectively while the other ends of linkages 126 and 128 respectively are commonly connected to the other end of connecting member 124. As the displaceable arm 114 moves from the open portion shown in FIG. 15 to the closed position in FIG. 16, the connecting member 124 moves from the open position to the closed position so as to cause the linkages 126 and 128 to move downwardly with the connecting member 124 and then draw the first and second arm 106 and 108 together and grip or cut the pin.

The first end of linkage 126 is connected to one end of first arm 126 while the first end of linkage 128 is connected intermediate the ends of arm 108. Moreover the pin removal tool 100 also includes a resilient means 130 which can consist of a rubber band or spring which is connected to the second arm 108 and the connecting member 124 so as to move the displaceable handle 114 to the biased open position shown in FIG. 15.

Accordingly, since the arms 106 and 108 are long enough to fit into a hole so as to grip or cut a cotter pin 26 with the valve 10, the pin removal tool 100 may be used to remove the rod 12 from the valve 10. Also the tool 100 can be used to reinsert the pin 26 into the lug as shall be described herein.

FIGS. 18 to 22 inclusive illustrate a third embodiment of the invention which include parts which are essentially the same as shown in FIGS. 7–11, except that the hole 70 has been replaced by a slot 71. The slot is located in the extension 44 and is adapted to receive a flat end 73 of the rod 12 which also has a hole 75. The slot 71 extends through the extension 44 and allows the rod 12 to pivot about adaptor 40 so as to accommodate valves 10 which may be disposed underground at a considerable angle from the horizontal. The rod is pivotally connected within slot 71 by connecting pin 113. Therefore for example if the valve 10 is buried underground at a 45 degree angle, the adaptor could sufficiently pivot about the end 73 of rod 12 so as to properly engage with valve 10 as described before. Finally, the socket 42 may also include slots 115 which extend through the body of the adaptor 40 so as to accommodate valves of different or larger sizes.

By utilizing the invention described herein an inoperable service box rod may be quickly, efficiently and cost-effectively repaired with minimal damage to the property or the owner. Furthermore by utilizing the high pressure water or air and vacuum method, repair or excavating may take place by means of a "no dig"/"trenchless" excavating method.

Moreover, this invention also discloses a new method of exposing a valve to repair an inoperable service box rod in a service box assembly having the valve below ground by creating a hole in the ground sufficient to clean the service box assembly by using a pressure fluid as described to clean the ground around the service box assembly for access to the inoperable service box rod. Thereafter the service box rod may be removed by the pin removal tool 100 to be replaced with the adapter described or with a prior art service box rod whereby a new prior art rod with the forks 14 is introduced into the hole that is created by the high pressure fluid and vacuumed out and then re-attached to the lug 28 by inserting the pin 26 through the holes 30 and 24 by the tool 100. Thereafter the service box assembly is inserted over the valve.

Although the preferred embodiments as well as the operations and use have been specifically described in relation to the drawings it should be understood that variations to the preferred embodiments could easily be achieved by a person skilled in the arts without departing from the spirit of the invention. Accordingly the invention should not be understood to be limited to the exact form revealed by the drawings. For example the drawings refer to a water valve, although the invention extends to other valves such as gas, oil, or any other valve for fluid, gas or liquids.

The embodiments of the invention in which an exclusive property or privilege is claimed are defined as follows:

1. A method of exposing a valve below ground level to repair an inoperable service box rod connected to said valve by connecting means in a service box assembly by creating a ground hole in said ground sufficient to clear said service box assembly by using a high-pressure fluid to loosen and clear said ground from around said service box assembly for access to said inoperable service box rod for repair of the service box rod by utilizing a tool to insert into said ground hole from the surface so as to disconnect and connect said connecting means, connecting said service box rod to said valve so as to repair said service box rod from the surface.

2. A method as claimed in claim 1 further including the steps of vacuuming said loosened ground.

3. A method as claimed in claim 2 wherein said fluid is high pressure water.

4. A method as claimed in claim 2 wherein said fluid is high pressure air.

5. A method as claimed in claim 1 wherein connecting means includes a pin, and wherein said method includes the steps of inserting said tool into said hole and removing said pin from said service box rod and valve and said ground hole.

6. A method as claimed in claim 5 wherein a new pin is grasped by said tool and said tool is inserted into said ground hole from the surface so as to connect said pin to said rod and said valve.

7. A method of repairing an inoperable service box rod in a service box assembly having a valve said valve having a valve stem with a hole for receiving a cotter pin below the ground said method comprising the steps of:
    (a) creating a ground hole in the ground exteriorally of said service box assembly by using a high-pressure fluid so as to break up said ground and produce ground debris and vacuuming said debris until said debris has been removed around said box assembly to said water valve;
    (b) removing said service box assembly from said hole, so as to permit access to said rod having fork means with aperture means at one end thereof;
    (c) grasping a cotter pin with a tool;
    (d) inserting said tool into said ground hole from the surface so as to insert said cotter pin into said aperture means, and said hole, so as to connect said rod to said fork means.

8. A method of repairing an inoperable service box rod in a service box assembly having a valve with a valve stem having a hole for receiving a pin below the ground said method comprising the steps of:
    (a) creating a ground hole in the ground exteriorally of said service box assembly by using a high-pressure fluid so as to break up said ground and produce ground debris and vacuuming said debris until said debris has been removed around said box assembly to said water valve;
    (b) removing said service box assembly from said hole, so as to permit access to said rod having fork means with aperture means at one end thereof;
    (c) removing said inoperable service box rod from said valve by inserting a pin removing tool into said ground hole from the surface and grasping and removing any existing pin from said aperture means and said hole thereby permitting disconnection between said service box road and said valve;
    (d) grasping a new pin with said tool and reinserting said tool into said ground hole from said surface so as to insert said new cotter pin into said aperture means and said hole so as to connect said rod to said fork means;
    (e) reintroducing said service box assembly into said ground hole over said rod and valve;
    (f) filling said ground hole.

9. A method as claimed in claim 8 wherein said new pin can comprise said existing pin.

10. A method as claimed in claim 8 wherein said fluid is high pressure water.

11. A method as claimed in claim 8 wherein said fluid is high pressure air.

12. A method as claimed in claim 8 wherein said tool includes first and second arms connected to gripping means for removing and inserting said pin wherein said arms are moved from an open position to a closed position.

13. A method as claimed in claim 12 wherein said tool includes a fixed handle fixedly secured to one of said arms and a displaceable handle connected to said other arm adapted to move said other arm relative said one of said arm so as to remove said pin.

14. A method as claimed in claim 13 wherein said second arm is longer than said first arm.

15. A method as claimed in claim 14 wherein said handle is fixedly secured to said second arm and disposed at 90 degrees relative said second arm.

16. A method as claimed in claim 15 wherein said displaceable handle is pivotally secured to said fixed handle.

* * * * *